UNITED STATES PATENT OFFICE.

STUART GWYNN, OF NEW YORK, N. Y., ASSIGNOR TO AMERICAN METALINE COMPANY, OF SAME PLACE.

IMPROVED COMPOSITION OF MATTER, CALLED "METALINE," FOR JOURNALS, BEARINGS, &c.

Specification forming part of Letters Patent No. 101,864, dated April 12, 1870; antedated March 30, 1870.

*To all whom it may concern:*

Be it known that I, STUART GWYNN, of the city of New York, in the county of New York and State of New York, have invented a new Composition of Matter, which I denominate "Metaline No. 4," designed for the purpose of journal-boxes, journal-box linings, and other similar articles having surfaces that are intended to be subjected in use to friction.

The nature of my invention consists in combining zinc and caoutchouc, or their equivalents, upon the principles and in pursuance of the method fully described and illustrated in the specification annexed to my application for Letters Patent for a process for making metaline, filed in the Patent Office simultaneously herewith, and to which reference is made, whereby I produce a composition of matter having such properties and conditions that so little friction will be caused, and so little heat developed in the practical use of the above-named articles made of it, in machinery and elsewhere in the arts, that the necessity for the application of oil or any other lubricant to their surfaces is entirely obviated.

To make this composition of matter, take of zinc ninety-five parts, and of fused caoutchouc five parts, by weight. The zinc is reduced to a fine powder, by abrasion, precipitation, or by grinding when near its melting-point, which latter is the mode I generally prefer. The two are then to be intimately mixed together. First put together about equal parts, and grind them in a suitable mill or stirrer for some time until incorporated. Then add the rest of the zinc, a little at a time, until the whole is completely mixed. The mass is then to be subjected to severe pressure in a suitable mold, to give it the required solidity.

In journal-boxes made of or lined with this composition, shafts may be run at a high speed without a lubricant.

While I intend to limit myself in this specification to brittle or unplastic pure metals, as plasticity is defined in the specification describing my process for making "metaline" above referred to, for the principal element of said composition, whose conditions need modifications to convert it into metaline, other brittle or unplastic pure metals, as plasticity is defined in the specification describing my process for making metaline above referred to, beside zinc, its equivalents for the purpose intended may be employed, and other agents besides caoutchouc, its equivalents for the purpose intended, may be used. So also the relative proportions of the zinc and caoutchouc, or their equivalents above stated, may be varied within the limits of the process hereinbefore referred to, without departing from the spirit of my invention.

I claim as my invention—

The manufacture or preparation of a composition of matters, which I denominate "Metaline No. 4," when the same possesses the properties and is compounded of the ingredients, or their equivalents, in the proportions, by the process, and for the purpose set forth.

STUART GWYNN.

Witnesses:
J. P. FITCH,
HENRY N. MYGATT.